3,823,221
PRODUCTION OF A CHAR REINFORCING AGENT FROM PYROLYZED SCRAP RUBBER

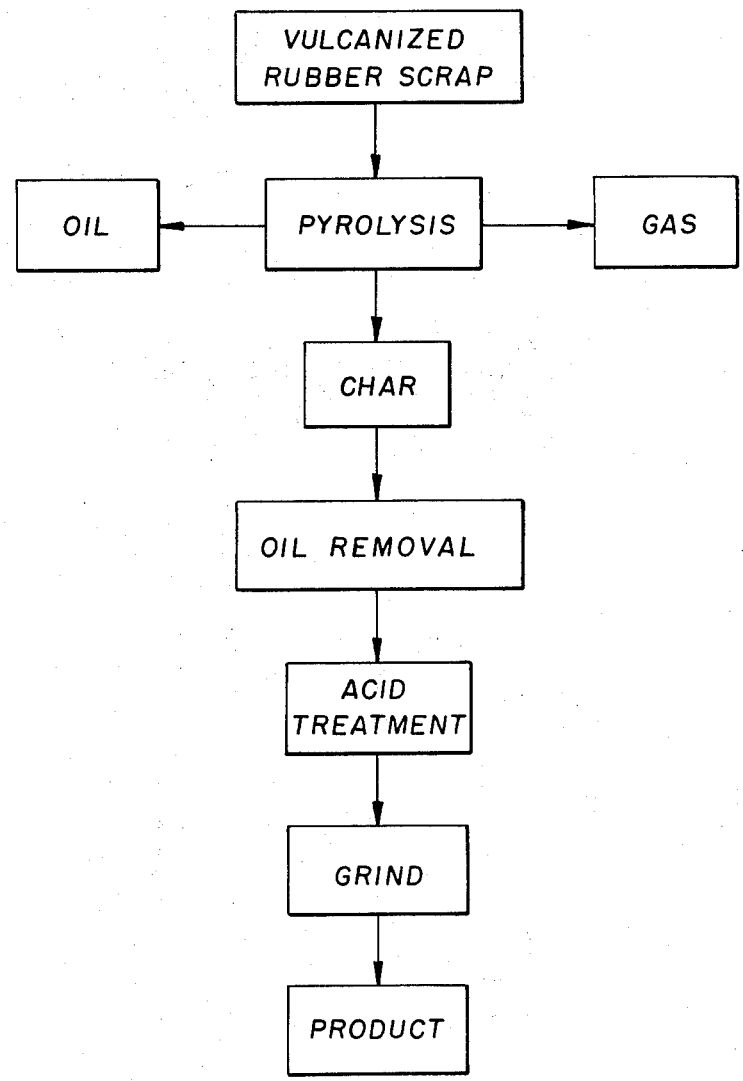

Lynn B. Wakefield, Grant Crane, and Edward Leo Kay, Akron, Ohio, assignors to The Firestone Tire & Rubber Company, Akron, Ohio
Filed Mar. 20, 1972, Ser. No. 236,290
Int. Cl. C01b 31/08
U.S. Cl. 423—449
3 Claims

ABSTRACT OF THE DISCLOSURE

The invention relates to a rubber reinforcing agent derived from vulcanized scrap rubber. The scrap rubber is charred, treated for removal of oil and then treated with acid to remove metal compounds. This is then reduced to fine particle size. The product has been found to be a very satisfactory rubber-reinforcing agent.

---

The invention relates to producing a rubber-reinforcing agent from vulcanized scrap rubber. It includes the process and the product.

The composition of vulcanized scrap rubber varies quite widely, being obtained from tires optionally with a percentage of rubber from other sources. The rubber scrap includes rubbers of different compositions, and usually rubbers made from different elastomers. The different rubbers contain different metal compounds. Most rubbers contain zinc oxide. The rubber obtained from tire treads usually contains other compounding ingredients in rather substantial amounts, which compounding ingredients are largely absent from the remainder of the tire. On the other hand, tire sidewalls usually contain titanium dioxide to produce a product of attractive color. This pigment is absent from tire treads. Thus, the scrap varies not only in the elastomer content but in the mineral content, etc.

In the production of the reinforcing agent of this invention, the scrap rubber is charred by heating in the substantial absence of air at a temperature of 1000 to 2500° F., and preferably at a temperature of about 1200 to 1800° F. Different types of pyrolizing equipment may be utilized. A Bartlett-Snow calciner has given satisfactory results.

Most scrap rubber contains at least a certain portion of oil used in the compounding of at least some of the rubbers which make up the scrap. Other oil is derived from decomposition of rubber polymers which are present. Some of this total oil content is volatilized during the pyrolization, but some remains, and it has been found that the oil which remains slows or prevents the vulcanization reaction. Therefore, at least most of the oil is removed. The product should contain no more than 5 parts by weight of the heavy oil produced by pyrolysis, per 100 parts of char.

It has been found that steam-treatment of the char is a very effective means for removing residual oil. For example, unground char obtained from the pyrolysis of scrap rubber vulcanizates when treated with aqueous mineral acid is not reduced in the ash content. However, if the unground char is steam-treated, the ash content of the steam-treated char can be significantly reduced by acid treatment.

There are many procedures which may be employed for reducing the oil content; such, for example, as recalcination at the same or higher temperature, extraction with organic solvents such as benzene, acetone, etc., and any one of a variety of procedures may be utilized. However, steam-treatment at 1000 to 2500° F. is a preferred method.

The unground char which is substantially free of oil is then treated with acid—usually a mineral acid and preferably an inexpensive acid such as sulfuric acid or hydrochloric acid—to remove metal compounds which may be present as oxides, sulfides, etc. and appear as ash. Ash is defined as the nonvolatile residue obtained by analytically burning the char. Such metal compounds are derived from the accelerator, antioxidant, pigments and other compounding ingredients used in preparing the rubber originally for vulcanization. Such metal compounds usually include zinc oxide, and often titanium dioxide. The acid solubilizes at least most of the metal compounds and they are removed as by subsequent filtration of the treating bath. The resulting product generally has an analysis such as the following:

In a typical example the char obtained by pyrolizing scrap rubber in the substantial absence of air, before acid-extraction of the ash, has the following analysis:

| | Weight percent |
|---|---|
| Zinc | 2.9 |
| Magnesium | 0.10 |
| Calcium | 0.04 |
| Aluminum | 0.44 |
| Titanium | 0.45 |
| Silicon | 0.69 |

After treatment with sulfuric acid the analysis of the char was:

| | Weight percent |
|---|---|
| Zinc | 1.4 |
| Magnesium | 0.03 |
| Calcium | 0.03 |
| Aluminum | 0.07 |
| Titanium | 0.09 |
| Silicon | 0.66 |

These analytical data indicate a siginficant reduction in the amounts of the metal compounds originally present in the char. Non-metal compounds such as silicon are not removed by the acid treatment. Approximately the same results would be obtained by using another mineral acid such as hydrochloric, etc.

The acid treatment of the unground char results in the production of valuable chemical compounds. For example, if sulfuric or hydrochloric acid is used, the zinc oxide, sulfide, etc. present in the char will be converted to zinc sulfate and zinc chloride which may be recovered as any suitable zinc compound for recycling in industry.

After reducing the ash content, the char is reduced to a fine particle size such as particles 50 percent by weight of which are fine enough to pass through a screen of 325 mesh. For certain reinforcing applications, as in some tires, a smaller particle size in which 90 percent passes through such a screen, may be required. Any suitable type of grinding equipment may be employed such as a hammer mill or fluid-energy mill. The oil removal may be additionally effected during the grinding operation as by using a fluid-energy mill with steam as the motive fluid.

The drawing by a flow sheet illustrates the procedure.

The char product which is substantially free from oil and metal compounds has been used satisfactorily as a reinforcing agent in the compounding of elastomers such as natural rubber, synthetic polyisoprene, butadiene-styrene copolymer, polybutadiene, butyl rubber, neoprene, ethylene-propylene copolymer (with or without diene), etc., in the manner in which carbon black has previously been used. The waste vulcanized scrap rubber may thus be utilized to reduce the wasteful carbonation of valuable fuels which is now being on on a large scale, for the production of carbon blacks which are used for rubber-reinforcing agents.

The removal of residual acid is important because the presence of acid in the reinforcing agent may retard vulcanization. The last of the acid is usually removed by washing which can take place in any suitable equipment and usually water alone will be employed. Bases such as sodium hydroxide, ammonium hydroxide, calcium hydroxide, organic amines, etc., may be added to neutralize acid which remains on the char particles.

Any base may be used with the general restriction that the salt which the base forms with the residual acid must not adversely affect the vulcanization reaction when the acid-treated ground char is used as a reinforcing agent in rubber. Furthermore, the amount of residual acid should be kept at a minimum so that subsequent formation of the salt formed by neutralization with base will not significantly increase the ash-content of the char. Such neutralization will usually be carried out as a final step of the washing procedure.

The acid-treated ground char may be used as such in the reinforcement of rubbers, but usually it will be pelletized as is customary in the treatment of carbon black for the production of reinforcing materials.

The ground char obtained may be used as a filler or a reinforcing agent in mechanical goods such as belts, pads or by proper handling as a general purpose reinforcing black to replace SRF (Semi-Reinforcing Furnace) black and GPF (General Purpose Furnace) black which are generally used in the carcasses of tires.

The general procedure for treating char produced by pyrolyzing scrap rubber at 1200 to 1800° F. in the substantial absence of air, follows; however, it should be noted that many variations of procedure may be utilized and found effective, and the claims are not limited to the examples summarized in what follows. The process may be carried out as a batch or continuous operation.

The general procedure is to charge the char to a vessel provided with good means of agitation. The acid used is usually dilute, such as a 10 wt. percent acid solution in water but concentrations from 1 wt. percent to 25 weight percent of thereabouts can be used. A wetting agent such as methanol, soap, etc. may optionally be added to effect better contact of the char with the acid solution. The concentration of the wetting agent may vary from zero to 10 wt. percent of the acid solution. The char/acid slurry is optionally heated to the boiling point or higher if a pressure reactor is used. The time of agitation may vary from 10 minutes to 24 hours depending upon the conditions of the treatment and how much ash is to be removed from the char. After the acid-treatment, the slurry is filtered and the acid solution may optionally be recycled to treat additional char. Optionally the acid solution from the filtration operation may be reconstituted to the original strength and recycled to treat addiional char.

An alternative procedure which may be followed is to neutralize the acid solution to a pH at which $Zn(OH)_2$ and other metal hydroxides or oxides will precipitate from the solution. The solution is filtered and a precipitate which contains several valuable metal hydroxides or oxides is obtained. This may be treated by conventional means to recover metal compounds which are recycled to manufacturing operations.

The char is then partially dried, and ground and optionally pelletized. The ground char may be used as a reinforcing agent as herein disclosed.

Although the preceding description covers the acid-treatment of unground char, specifically steam-treated unground char, it has also been determined that acid-treatment of ground char (preferably steam-treated prior to grinding) is an effective means of reducing the ash content of the char.

EXAMPLE 1

Scrap tires, which are generally representative of tires which can no longer be retreaded because of damaged bodies, were cut into approximately one-inch squares and calcined at 1200° F. The char thus obtained was recalcined at 1400° F. in the presence of steam for more complete removal of the oil. Treatment of the steam-treated char with boiling 10 wt. percent aqueous sulfuric acid for 16 hours reduced the ash-content from 11.2 wt. percent to 7.5 wt. percent.

EXAMPLE 2

In another experiment the unground char obtained from the pyrolysis of scrap rubber vulcanizes was steam-treated at 1470° F. for approximately four hours. The steam-treated char was treated with boiling 10 wt. percent aqueous sulfuric acid for 16 hours. The ash content was reduced from 20.1 wt. percent of 6.1 wt. percent.

By the steam treatment the ash content is reduced below 10 percent of the weight of the product.

The removal of the ash content of the char increases its effective surface area. When the acid-treated char is compounded with rubber, superior reinforcing is obtained.

The examples are recited only as illustrative of the methods of treating char with steam to remove oil and then with acid to lessen or obliterate the ash-content.

We claim:

1. A process of producing a rubber reinforcing agent which comprises pyrolyzing at 1000 to 2500° F. in the substantial absence of oxygen, vulcanized scrap rubber containing metal compounds and producing oil-contaminated char, removing substantially all of the oil from the char by steam-treatment at 1000 to 2500° F., treating the char with aqueous mineral acid to reduce the ash content substantially to below 10% and after the acid treatment grinding so that the resulting char is of such particle size that at least 50 percent will pass through a 325-mesh screen.

2. The process of claim 1 in which the acid used is sulfuric acid.

3. The process of claim 1 in which the acid used is hydrochloric acid.

References Cited

UNITED STATES PATENTS

| | | | |
|---|---|---|---|
| 3,644,131 | 2/1972 | Gotshall | 260—763 |
| 3,420,913 | 1/1969 | Railsback | 260—41.5 R |
| 2,008,145 | 7/1935 | Morrell | 252—425 |
| 3,018,288 | 1/1962 | Tokime et al. | 252—421 |
| 3,582,279 | 6/1971 | Beckman et al. | 252—421 |

DANIEL E. WYMAN, Primary Examiner

P. E. KONOPKA, Assistant Examiner

U.S. Cl. X.R.

106—307; 201—2.5, 25, 38; 252—421, 445; 260—41.5 R, 763; 423—445, 460, 461

UNITED STATES PATENT OFFICE
CERTIFICATE OF CORRECTION

Patent No. 3,823,221      Dated July 9, 1974

Inventor(s) Lynn B. Wakefield, Grant Crane and Edward L. Kay

It is certified that error appears in the above-identified patent and that said Letters Patent are hereby corrected as shown below:

In Column 2, Line 70, "being" should be --going--.

In Column 3, Line 54, "addiional" should be --additional--.

In Column 4, Line 19, "vulcanizes" should be --vulcanizates--.

In Column 4, Line 24, "of" should be --to--.

Signed and sealed this 26th day of November 1974.

(SEAL)
Attest:

McCOY M. GIBSON JR.      C. MARSHALL DANN
Attesting Officer      Commissioner of Patents